Patented Dec. 4, 1951

2,577,390

UNITED STATES PATENT OFFICE 2,577,390

POLYMERIZATION TERMINATION AGENT

William Harold Watson, Sarnia, Ontario, Canada, assignor to Polymer Corporation, Limited, Sarnia, Ontario, Canada, a corporation No Drawing. Application April 30, 1948, Serial No. 24,440. In Canada April 28, 1948

5 Claims. (Cl. 260—17.5)

This invention relates generally to the termination of the emulsion polymerization of dienes with or without secondary monomers. More particularly it relates to the termination, commonly called "short-stopping," of such emulsion polymerization reactions at a desired degree of conversion whereby further unwanted polymerization is prevented. The polymerization systems referred to may include promoters, catalysts, antifreeze agents and other variations required for specific practices.

Well known and widely used methods of short-stopping emulsion polymerization reactions of this type involve the addition of small amounts of such reagents as hydroquinone or sodium sulphide to the reacting emulsion.

While these "shortstopping agents" are effective in terminating the reaction and maintaining the reaction product unchanged during the subsequent processing to dry polymer, they are unsatisfactory in certain other respects. The presence of hydroquinone imparts a bluish tinge to the latex and a dark colour to the polymer coagulated therefrom. Sodium sulphide in the system results in a concentration of sulphides which is extremely corrosive to equipment and which may be hazardous to personnel.

Accordingly it is the object of this invention to effectively terminate the emulsion polymerization reaction of dienes with or without secondary monomers at any desired degree of conversion by the addition of a component which does not embody the disadvantages enumerated above.

It has been found that the addition of lignin to an emulsion polymerization of a diene with or without secondary monomers will effectively terminate the reactions which take place within the system.

It has been found that the most satisfactory method of adding lignin is by solution where the pH of the addition solution is substantially equal to the pH of the reacting emulsion. By this method adequate dispersion of the lignin through the emulsion may be more readily achieved. Unless the pH of the addition solution containing the lignin is substantially equal to that of the emulsion coagulation may occur prematurely.

The following is an example to illustrate the practice of the present invention:

Example

Butadiene and styrene were charged with other components used in the GR-S polymerization reaction and were allowed to react at 120° F. until the total solids present indicated monomer conversion of about 60%. Lignin dissolved in an aqueous solution was then injected into the polymerization reaction in the proportion of 1.5 parts by weight of lignin per 100 parts by weight of monomers and the system was allowed to react for a further 24 hours. Samples taken at the time of injection of lignin and at the completion of the further 24 hours under reaction conditions indicated that no change had occurred in total solids. The intrinsic viscosity of the polymer samples withdraw before and after the said 24 hour post reaction period, indicated no change in molecular structure. The combination of these two results is proof that lignin used in this proportion effectively terminates the GR-S polymerization reaction. This test was repeated at 30% conversion and the same results were achieved. It is possible to add the lignin in a dry condition and achieve the desired termination results as the lignin will dissolve in the emulsion. Care must be exercised to secure adequate dispersion if this method is followed.

An additional advantage of this method of shortstopping the polymerizing reactions lies in the fact that the product is effectively stabilized against the effects of normal aging. Consequently the addition of a further component for this purpose is unnecessary. The low cost and abundant supply of lignin adds a considerable economic advantage to the use of this material as a reaction terminating agent.

Lignin is a cellulose-like substance which lines woody fibres. The exact chemical constitution of lignin is not well known but it is probably a cyclic unsaturated compound. At present it is in plentiful supply as a by-product of the paper industry which uses large quantities of wood as a source of cellulose.

It has recently been discovered that lignin can be produced with varying degrees of oxidation. Lignin in the unoxidized condition is usually designated as "soft" whereas oxidized lignin is referred to as "hard." In the practice of this invention both forms of lignin may be used although the "soft" form is preferred and was used in the examples set out above.

Lignin is insoluble or difficulty soluble in diene type polymers and although completely dispersed throughout the polymer while in the emulsion stage, it will not migrate after coagulation and could not therefore act to stain adjacent polymer even if a discolouration tendency did exist.

The term GR-S has been used throughout the description of the invention to indicate polymers and copolymers of butadiene and styrene and such designation is well known to those skilled in the art. Other polymerization reactions such as butadiene with acrylonitrile and butadiene with styrene where the styrene content is in excess of the butadiene content have been successfully terminated by means of this invention.

I claim:

1. In the emulsion polymerization of compositions selected from the group consisting of butadiene and admixtures of butadiene with a copolymerizable compound the step which comprises adding lignin to the reaction mixture during polymerization of the same to terminate the polymerization reaction.

2. In the emulsion polymerization of compositions selected from the group consisting of butadiene and admixtures of butadiene with a copolymerizable compound the step which comprises adding to the reaction mixture during polymerization of the same an aqueous solution of lignin to terminate the polymerization reaction.

3. In the emulsion polymerization of compositions selected from the group consisting of butadiene and admixtures of butadiene with a copolymerizable compound the step which comprises adding to the reaction mixture during polymerization of the same an aqueous solution containing 1.5 parts by weight of lignin for every 100 parts of monomer to terminate the polymerization reaction.

4. In the emulsion polymerization of butadiene in admixture with styrene the step which comprises adding to the reaction mixture during polymerization of the same an aqueous solution containing 1.5 parts by weight of lignin for every 100 parts of monomer to terminate the polymerization reaction.

5. In the emulsion polymerization of butadiene in admixture with acrylonitrile the step which comprises adding to the reaction mixture during polymerization of the same an aqueous solution containing 1.5 parts by weight of lignin for every 100 parts of monomer to terminate the polymerization reaction.

WILLIAM HAROLD WATSON.

REFERENCES CITED

The following references are of record in the file of this patent:

UNITED STATES PATENTS

| Number | Name | Date |
| --- | --- | --- |
| 2,355,180 | Remy | Aug. 8, 1944 |
| 2,432,386 | Craig | Dec. 9, 1947 |

OTHER REFERENCES

Indulin for Reinforcing Rubber, Bulletin L-4 of the Development Department, Industrial Chemical Sales Division of the West Virginia Pulp and Paper Co., New York, N. Y., 31 pages (1946).